（12）United States Patent
Oda et al.

(10) Patent No.: US 7,878,285 B2
(45) Date of Patent: Feb. 1, 2011

(54) POWER UNIT FOR A VEHICLE (75) Inventors: Kaoru Oda, Akashi (JP); Taisuke Morita, Itami (JP); Izumi Takagi, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 670 days.

(21) Appl. No.: 11/899,400

(22) Filed: Sep. 4, 2007

(65) Prior Publication Data

US 2008/0060867 A1     Mar. 13, 2008

(30) Foreign Application Priority Data

Sep. 6, 2006     (JP) ............................... 2006-241802

(51) Int. Cl.
*B60K 5/04*     (2006.01)
(52) U.S. Cl. .................................... 180/296; 180/69.1
(58) Field of Classification Search ................. 180/291, 180/292, 294, 296, 297, 298, 299, 309, 69.1
See application file for complete search history.

(56) References Cited

U.S. PATENT DOCUMENTS

| 3,645,350 | A | * | 2/1972 | Deli et al. ..................... 180/9.1 |
| 4,655,307 | A | * | 4/1987 | Lamoureux ................. 180/69.1 |
| 4,821,827 | A | | 4/1989 | Reese |
| 4,962,825 | A | * | 10/1990 | Albright et al. ............. 180/292 |
| 5,570,757 | A | * | 11/1996 | Courtwright et al. ........ 180/291 |
| 5,915,495 | A | | 6/1999 | Kerlin et al. |
| 6,050,358 | A | * | 4/2000 | Kays et al. ................... 180/294 |
| 6,941,920 | B1 | * | 9/2005 | Thurm et al. ............ 123/195 C |
| 7,083,024 | B2 | * | 8/2006 | Bergman et al. ............ 180/291 |

\* cited by examiner

*Primary Examiner*—Frank B Vanaman
(74) *Attorney, Agent, or Firm*—Alleman Hall McCoy Russell & Tuttle LLP (57) ABSTRACT

A power unit for a vehicle including an engine configured to drive the vehicle, a transaxle coupled to a drive wheel, a power transmission system which is coupled to the engine and to the transaxle and is configured to transmit a rotational force output from the engine to the transaxle, and a base plate fastened to the engine and to the transaxle so as to cover a lower surface of the engine and a lower surface of the transaxle.

10 Claims, 10 Drawing Sheets

POWER UNIT FOR A VEHICLE

TECHNICAL FIELD

The present invention relates to a power unit mounted in a vehicle such as a golf cart that travels at a low speed.

BACKGROUND ART

Conventionally, in lightweight and small vehicles such as a golf cart, an inexpensive, lightweight and small power unit is desirably mounted. One example of such a power unit includes an engine and a transaxle in which a reduction gear, a differential gear, and an axle are integral with each other, both the engine and transaxle being unitarily mounted to a frame member. For example, in a golf cart disclosed in U.S. Pat. No. 4,821,827, a transaxle with an axle oriented rightward and leftward and an engine disposed forward of the transaxle are mounted to a vehicle body in such a manner that they are supported by a frame of pipe-shaped and other frame members. In a vehicle disclosed in U.S. Pat. No. 5,915,495, an engine is held from below by a plate-shaped support member bent in an L-shape in a side view, and a transaxle disposed behind the engine is fastened to a rear panel section of the support member by bolts.

In the golf cart disclosed in U.S. Pat. No. 4,821,827, since it is difficult to handle one pipe frame in a bent state, it becomes necessary to weld a plurality of pipe frames to each other, causing poor productivity and increasing the number of components. Furthermore, a number of gaps formed in the pipe frames make it difficult to protect the engine and the transaxle.

In the vehicle disclosed in U.S. Pat. No. 5,915,495, the plate-shaped support member is located only below the engine, and thus the transaxle is exposed from below. Therefore, obstacles and others from below are likely to contact a lower surface of the transaxle during traveling of the vehicle, degrading durability of the transaxle.

SUMMARY OF THE INVENTION

The present invention addresses the above described condition, and an object of the present invention is to provide a lightweight and compact power unit for a vehicle which includes an engine and a transaxle unitarily mounted and has high durability and productivity.

According to the present invention, there is provided a power unit for a vehicle comprising an engine configured to drive the vehicle; a transaxle coupled to a drive wheel; a power transmission system which is coupled to the engine and to the transaxle and is configured to transmit a rotational force output from the engine to the transaxle; and a base plate fastened to the engine and to the transaxle so as to cover a lower surface of the engine and a lower surface of the transaxle.

In such a construction, since the engine and the transaxle are unitarily fastened by using the plate-shaped base plate, rather than a pipe frame, productivity of the power unit is improved. Furthermore, since the plate-shaped base plate covers the lower surface of the transaxle as well as the lower surface of the engine, obstacles and others from below will not contact the lower surface of the transaxle during traveling of the vehicle. As a result, durability of the power unit is improved.

The base plate may include a planar bottom wall portion configured to cover the lower surface of the engine and the lower surface of the transaxle, and a pair of side wall portions respectively protruding upward from both end portions of the bottom wall portion.

In such a construction, since the base plate formed by the bottom wall portion and the side wall portions has a concave cross-section, stiffness of the base plate is improved in contrast to a base plate formed only by the flat plate.

The power unit for a vehicle may further comprise a side plate laterally fastened to the engine, to the transaxle, and to the base plate; wherein an output shaft of the engine and an input shaft of the transaxle protrude laterally in the same direction; and wherein the side plate may have a first insertion portion into which the output shaft is inserted to position the engine and a second insertion portion into which the input shaft is inserted to position the transaxle.

In such a construction, since the engine, the transaxle, and the base plate are coupled to each other by the side plate, stiffness of the entire power unit can be improved. Furthermore, since the output shaft of the engine and the input shaft of the transaxle are positioned by the side plate, the power transmission system can be easily and surely mounted to the output shaft and the input shaft.

The side plate may be a flat plate, and may be fastened to a side surface of the engine, to a side surface of the transaxle, and to a side surface of the base plate by bolts.

Since the side plate is a flat plate and can be easily manufactured by punching or the like, a manufacturing cost can be reduced. In addition, stiffness of the power unit can be increased in a direction of a plane of the side plate (direction parallel to a surface of the side plate). In addition, since the side plate couples the engine, the transaxle, and the base plate, stiffness of the power unit can be further increased.

The power unit for a vehicle may further comprise a generator configured to be driven by the engine to generate electric power; wherein a transmission belt is installed around a pulley of the output shaft of the engine and a pulley of an input shaft of the generator. The generator may be fastened to a generator bracket configured to couple the engine to the transaxle and to the side plate.

In such a configuration, since the engine and the transaxle are coupled to each other via the generator bracket and the generator fastened to the generator bracket is fastened to the side plate, stiffness of the entire power unit can be increased.

The generator may be rotatably mounted on a common axis to the generator bracket and to the side plate; and the power unit may further comprise a tensioner configured to apply a force to cause the generator to be rotated around the common axis in a direction to apply a tension to the transmission belt.

The tensioner may include a side bracket coupled to the side plate and to the engine, and an extensible rod protrusible from the side bracket. The extensible rod may be coupled to the generator and is extensible and retractable to cause the generator to be rotated.

In such a construction, merely by adjusting a protruding amount of the extensible rod protruding from the side bracket, the generator is rotated, so that a distance between the output shaft of the engine and the input shaft of the generator is changed. This makes it easy to adjust the tension to be applied to the transmission belt.

The power unit may further comprise a joint bracket fastened to the base plate to couple the power unit to the vehicle body frame. The joint bracket may be provided to couple the pair of right and left side wall portions to each other.

In such a construction, since the right and left side wall portions are coupled to each other by the joint bracket, stiffness of the base plate can be increased. In addition, since the joint bracket is separate from the base plate and position or the like of mounting portions of the vehicle body frame can be addressed by changing only the joint bracket, flexibility of design change or the like is improved.

The power unit may further comprise a muffler coupled to the engine through an exhaust pipe; wherein the muffler may be coupled to the base plate and/or to the transaxle by a muffler bracket, and the muffler bracket may be bent so as to have elasticity.

In such a construction, even if the exhaust pipe is thermally deformed by heat of the exhaust gas, the resulting load is absorbed by the muffler bracket coupling the muffler to the base plate and/or the transaxle, because of its elasticity. This makes it possible to avoid an event that the exhaust pipe is subjected to undesired stress.

The above and further objects and features of the invention will more fully be apparent from the following detailed description with accompanying drawings.

DETAILED DESCRIPTION OF THE PREFERRED EMBODIMENTS

Figure 1:
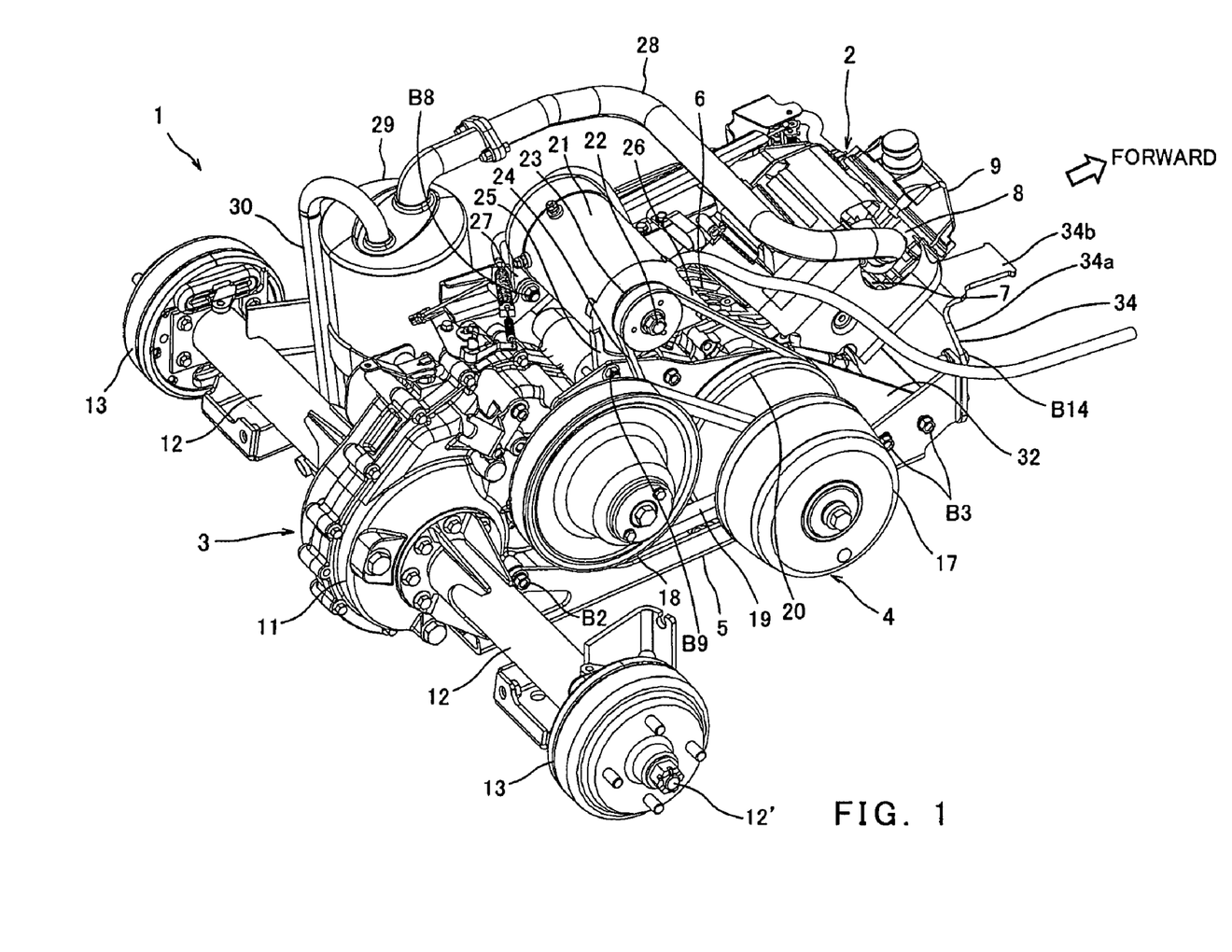
FIG. 1 is a perspective view of a power unit for a vehicle according to an embodiment of the present invention.
Figure 2:
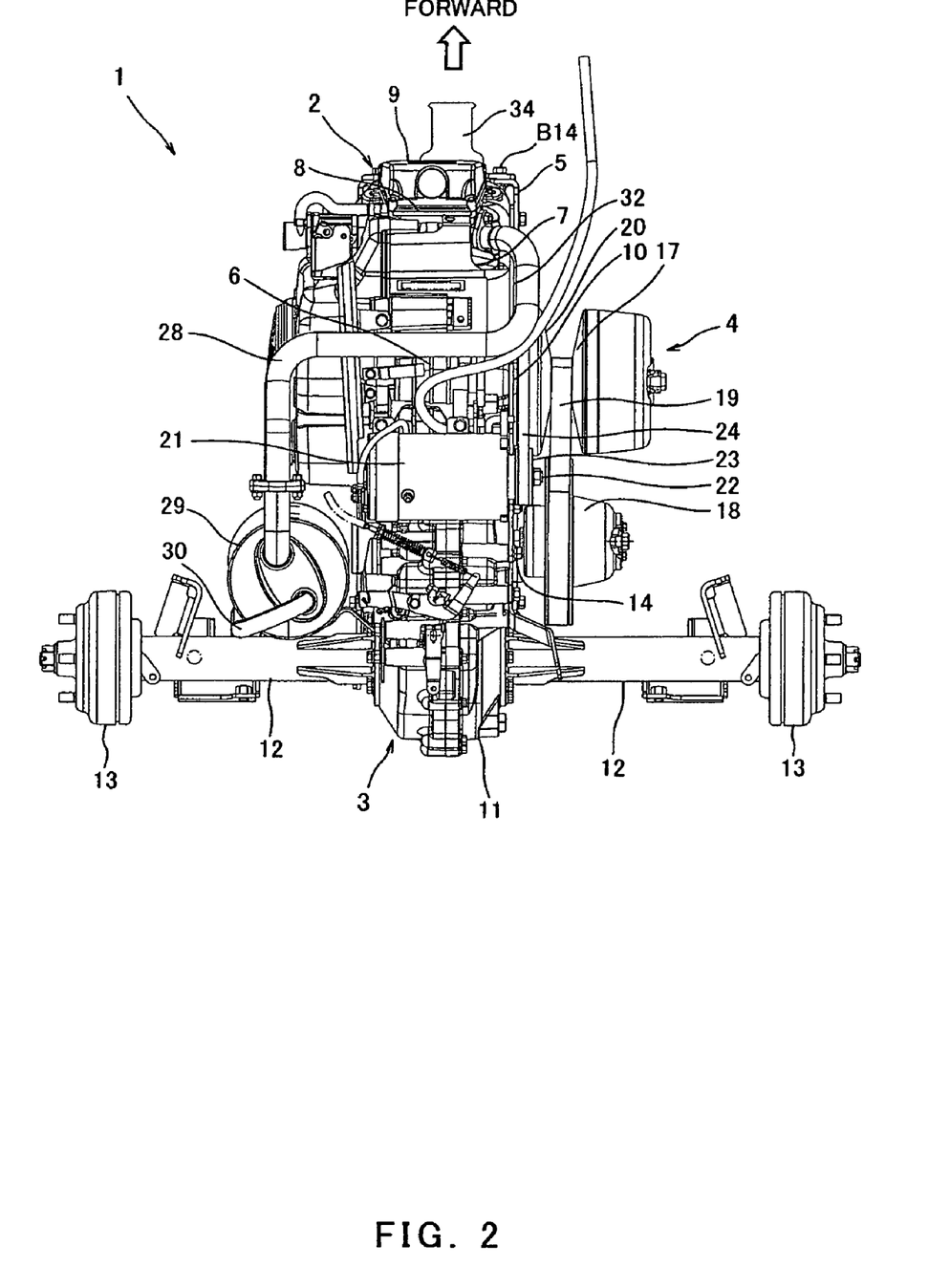
FIG. 2 is a plan view of the power unit for the vehicle of FIG. 1.
Figure 3:
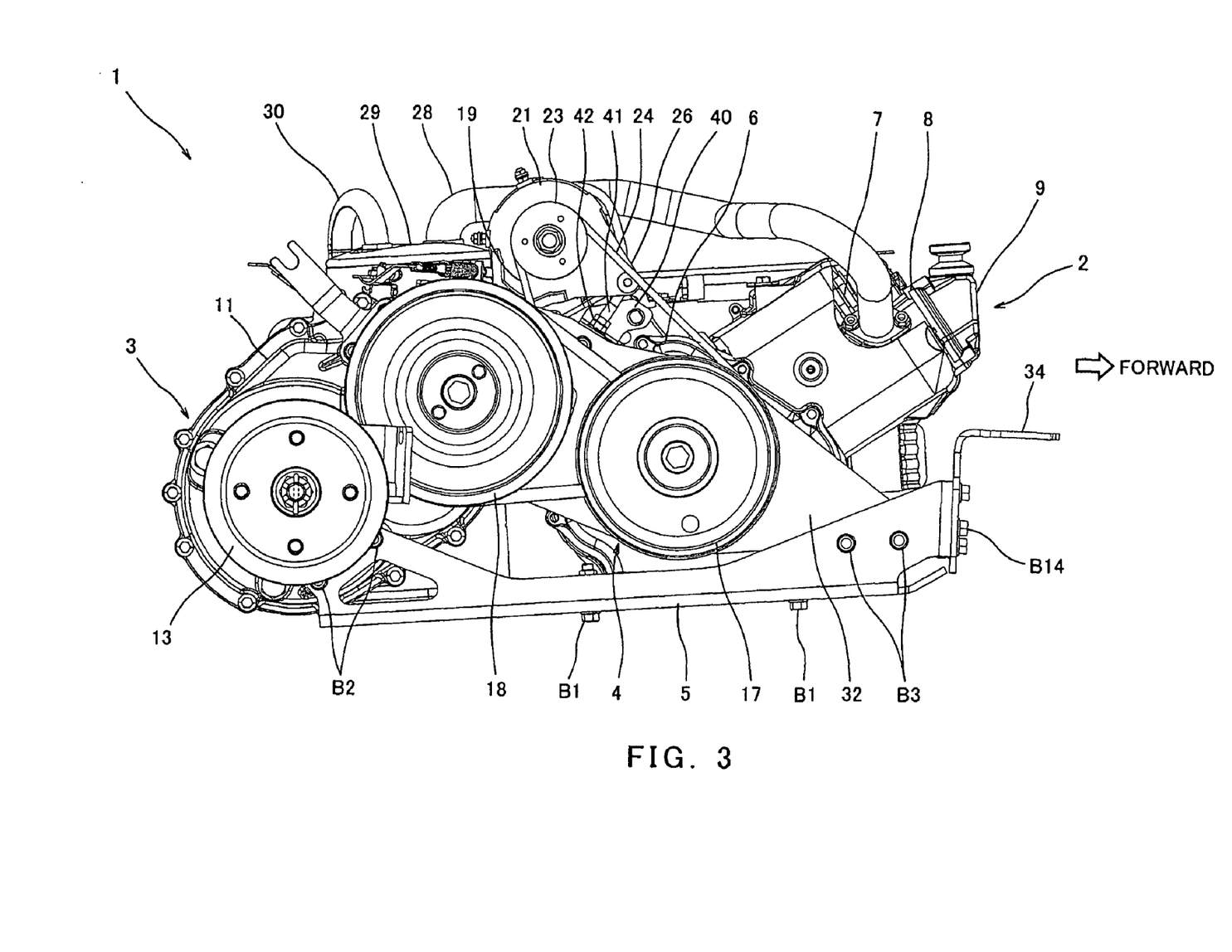
FIG. 3 is a right side view of the power unit for the vehicle of FIG. 1.
Figure 4:
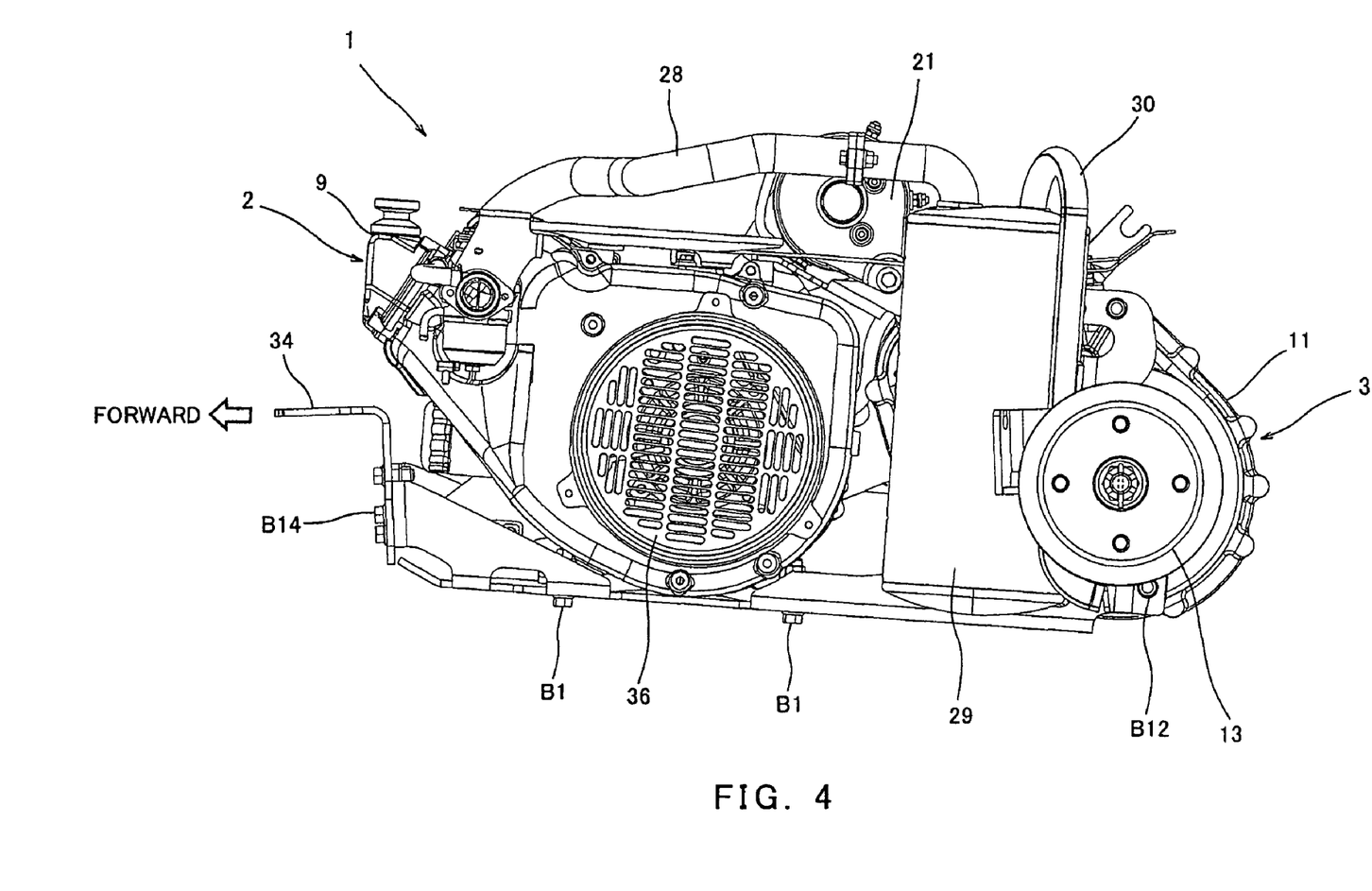
FIG. 4 is a left side view of the power unit for the vehicle of FIG. 1.

Thereinafter, an embodiment of the present invention will be described with reference to the drawings. FIG. 1 is a perspective view of a power unit 1 for a vehicle according to an embodiment of the present invention. FIG. 2 is a plan view of the power unit 1 of FIG. 1. FIG. 3 is a right side view of the power unit 1 of FIG. 1. FIG. 4 is a left side view of the power unit 1 of FIG. 1. As shown in FIGS. 1 to 4, the power unit 1 is mounted in a low-speed vehicle such as a golf cart (not shown) and includes an engine 2 configured to drive the vehicle, a transaxle 3 coupled to a drive wheel (not shown), and a continuously variable transmission (CVT) 4 which is coupled to the engine 2 and to the transaxle 3 and serves as a power transmission system configured to transmit a rotational force output from the engine 2 to the transaxle 3.

The engine 2 includes a crankcase 6 from which an output shaft (crankshaft) 10 protrudes rightward in the lateral direction, a cylinder block 7 protruding obliquely forward from the crankcase 6, a cylinder head 8 located on an upper portion of the cylinder block 7, and a cylinder head cover 9 located over the cylinder head 8 to cover the cylinder head 8 from above.

The transaxle 3 includes a gear box 11 from which an input shaft 14 protrudes rightward, i.e., in the same direction as the output shaft 10 of the engine 2 protrudes, an axle pipe 12 protruding rightward and leftward from the gear box 11, an axle 12' inserted into the axle pipe 12, and brake units 13 which are mounted to right and left ends of the axle 12' and are coupled to drive wheels (not shown) of the vehicle. The transaxle 3 is disposed behind the engine 2. The gear box 11 contains a reduction gear (not shown) coupled to the input shaft 14 and a differential gear (not shown) through which a rotational force of the reduction gear is transmitted to the axle 12'.

The CVT 4 includes a drive pulley 17 mounted on the output shaft 10 of the engine 2, a driven pulley 18 mounted on the input shaft 14 of the transaxle 3, and a transmission belt 19 installed around the drive pulley 17 and the driven pulley 18, and is configured to change the speed of the rotational force from the engine 2 and to transmit the resulting rotational force to the transaxle 3.

A metal base plate 5 is fastened to the gear box 11 of the transaxle 3 and to the engine 2 by bolts B1 and B2 so as to cover a lower surface of the gear box 11 and a lower surface of the engine 2.

Figure 5:
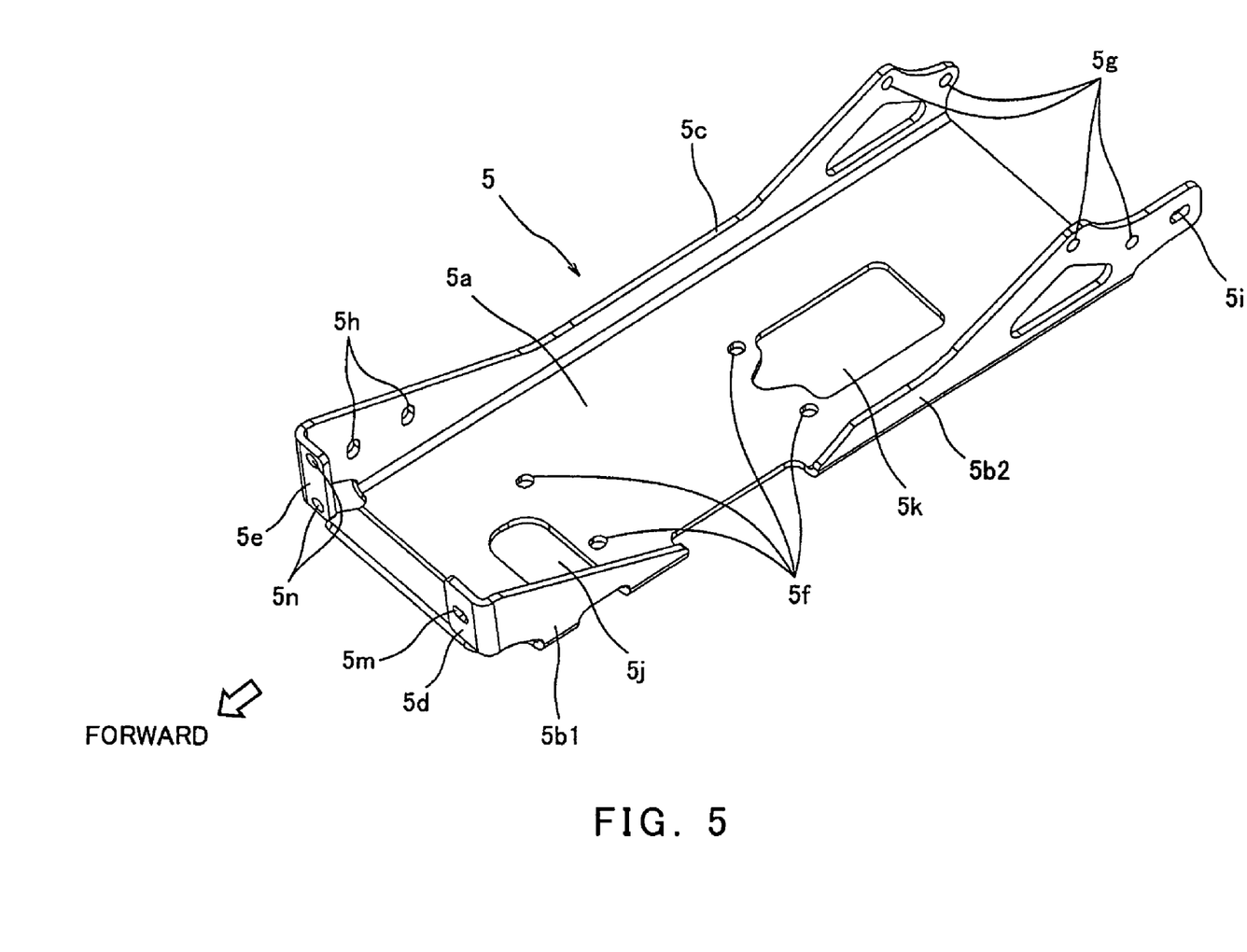
FIG. 5 is a perspective view of a base plate of the power unit for the vehicle of FIG. 1.

FIG. 5 is a perspective view of the base plate 5 of the power unit 1 of FIG. 1. As shown in FIG. 5, the base plate 5 includes a flat bottom wall portion 5a covering the lower surface of the engine 2 and the lower surface of the gear box 11 of the transaxle 3, a first left side wall portion 5b1 protruding upward from a front portion of a left end of the bottom wall portion 5a, a second left side wall portion 5b2 protruding upward from a rear portion of the left end of the bottom wall portion 5a, and a right side wall portion 5c protruding upward over an entire length of a right end of the bottom wall portion 5a. Bolt holes 5f to fasten the engine 2 and openings 5j and 5k are formed on the bottom wall portion 5a. A pair of elongate bolt holes 5h are formed at a front region of the right side wall portion 5c to fasten a metal flat side plate 32 (FIG. 3) thereto as described later. Bolt holes 5g are formed at a rear region of the right side wall portion 5c and the second side wall portion 5b2 to fasten the transaxle 3. An elongate bolt hole 5i is formed on the second left side wall portion 5b2 to fasten a first muffler bracket 44 (FIG. 9) as described later. Mounting portions 5d and 5e are formed at a front end portion of the first left side wall portion 5b1 and a front end portion of the right side wall portion 5c, respectively in such a manner that they are bent close to each other. Bolt holes 5m and 5n are respectively formed on the mounting portions 5d and 5e to fasten a metal joint bracket 34 (FIG. 1) by which the power unit 1 is coupled to a vehicle body frame (not shown). The bolt hole 5m is an elongate hole to allow for dimensional tolerance.

As shown in FIGS. 1 to 5, the metal joint bracket 34 is fastened to the mounting portions 5d and 5e of the base plate 5 by bolts B14 and is coupled to a vehicle body frame (not shown). The joint bracket 34 includes a vertical plate portion 34a fastened by the bolts B14 to the mounting portion 5e of the right side wall portion 5c and to the mounting portion 5d of the first left side wall portion 5b1 to couple them to each other and a coupling plate portion 34b protruding horizontally forward from a center region of an upper end of the vertical plate portion 34a and being inserted into a coupling hole (not shown) formed on the vehicle body frame to restrict movement of the front portion of the power unit 1.

A generator 21, which also serves as a starter motor, is mounted above a region between the engine 2 and the transaxle 3. The generator 21 is provided with a second driven pulley 23 mounted on an input shaft 22 thereof protruding rightward. A second drive pulley 20 for the generator 21 is mounted on the output shaft 10 of the engine 2 and is located inward of the drive pulley 17 of the CVT 4. A transmission belt 24 is installed around the second drive pulley 20 and the second driven pulley 23 to transmit a part of the rotational force from the engine 2 to the generator 21.

An upstream end of a first exhaust pipe 28 in a flow direction of exhaust gas is coupled to the cylinder head 8 of the engine 2. A downstream end of the first exhaust pipe 28 is coupled to an upper surface of a muffler 29 disposed in front of the left axle pipe 12 and on the left side of a rear portion of the base plate 5. The muffler 29 is disposed such that its axis is oriented vertically. An upstream end of a second exhaust pipe 30 is coupled to the upper surface of the muffler 29, and a downstream end thereof extends to a region in close proximity to a lower portion of the muffler 29. An air cooling fan 36 (FIG. 4) is mounted on the left side of the engine 2.

Figure 6:
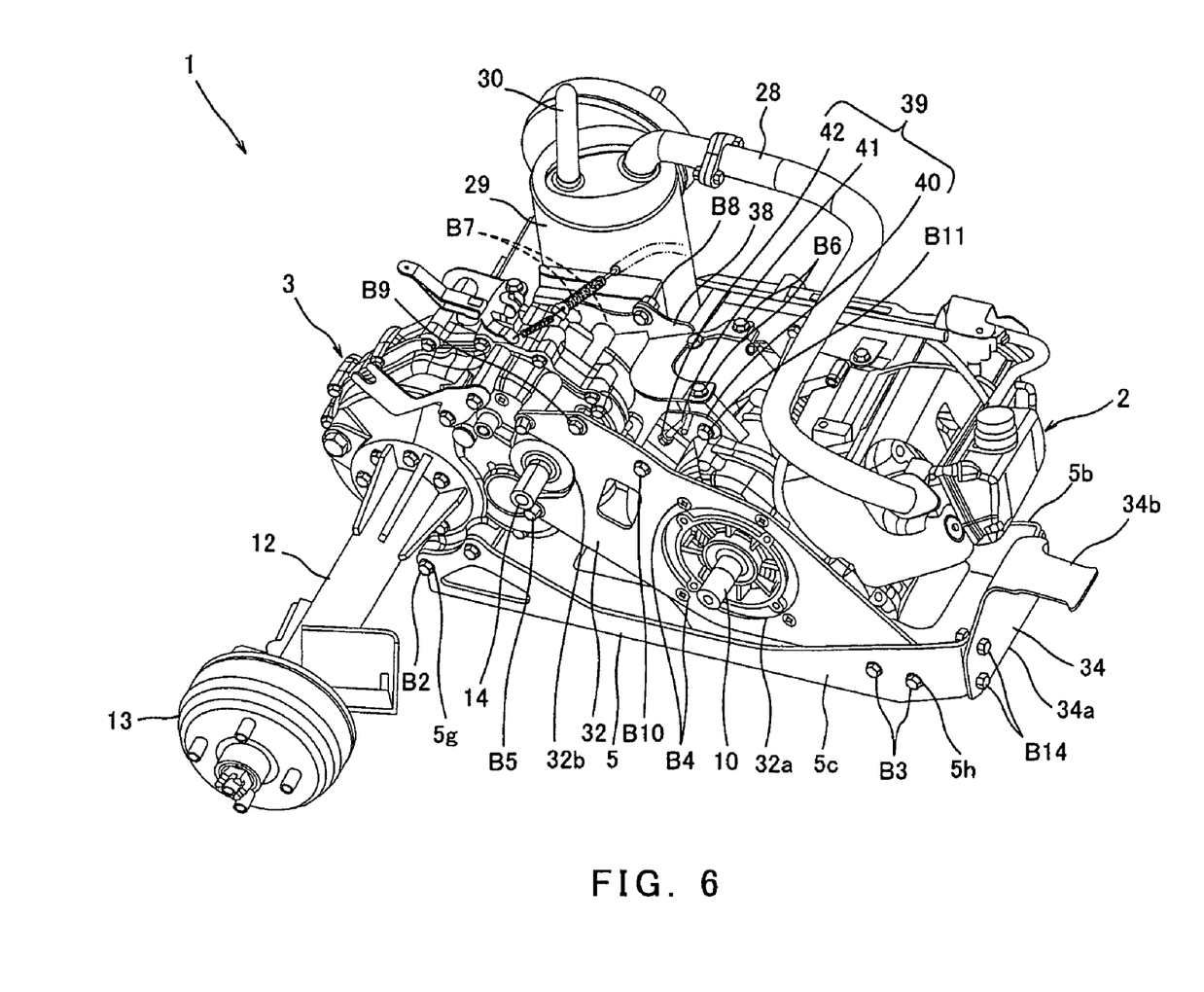
FIG. 6 is a perspective view of the power unit for the vehicle of FIG. 1, from which a continuously variable transmission and a generator are removed.

FIG. 6 is a perspective view of the power unit 1 of FIG. 1, from which the CVT 4 and the generator 21 are removed. As shown in FIG. 6, the metal flat side plate 32 manufactured by punching is fastened to the engine 2, to the transaxle 3, and to the base plate 5. The side plate 32 is fastened to a front portion of the right side wall portion 5c of the base plate 5 by bolts B3. The side plate 32 extends upward and rearward, toward the transaxle 3, from a location where the side plate 32 is fastened to the right side wall portion 5c of the base plate 5. The side plate 32 has a through hole (first insertion portion) 32a into which the output shaft 10 of the engine 2 is loosely inserted and to which an outer periphery of a boss protruding from a right side wall of the crankcase 6 (FIG. 1) of the engine 2 to extend concentrically with the output shaft 10 is fitted for enabling positioning between the engine 2 and the side plate 32, and a cut portion (second insertion portion) 32b into which the input shaft 14 of the transaxle 3 is loosely inserted and to which an outer periphery of a boss protruding from a right side wall of the gear box 11 (FIG. 1) of the transaxle 3 to extend concentrically with the input shaft 14 is fitted for enabling positioning between the transaxle 3 and the side plate 32.

The side plate 32 is fastened to a right side wall of the engine 2 by bolts B4 at four locations in close proximity to and outside the through hole 32a and to a right side wall of the transaxle 3 by a stud B5 and a nut at two locations in close proximity to and outside the cut portion 32b. Since the side plate 32 fastened to the engine 2 and the transaxle 3 is fastened to the base plate 5 by bolts B3, improving stiffness of the power unit 1. In this embodiment, bolt mounting portions of the engine 2, the transaxle 3 and the base plate 5 to which the side plate 32 is fastened by bolts are on the same plane.

A metal generator bracket 38 is mounted on an upper region at the left side between the engine 2 and the transaxle 3 and is configured to couple an upper portion of the engine 2 to an upper portion of the transaxle 3. The generator bracket 38 is fastened to the engine 2 by bolts B6 and to the gear box 11 of the transaxle 3 by bolts B7. As shown in FIG. 1, the generator 21 is rotatably mounted to the generator bracket 38 (FIG. 6) by a bolt B8 and is rotatably mounted to the side plate 32 of the vehicle by the bolt B9. The bolt B8 and the bolt B9 are aligned on a common axis in the lateral direction. The generator 21 is mounted to the generator bracket 38 and the side plate 32 to be rotatable around the common axis of the bolts B8 and B9 aligned coaxially.

Figure 7:
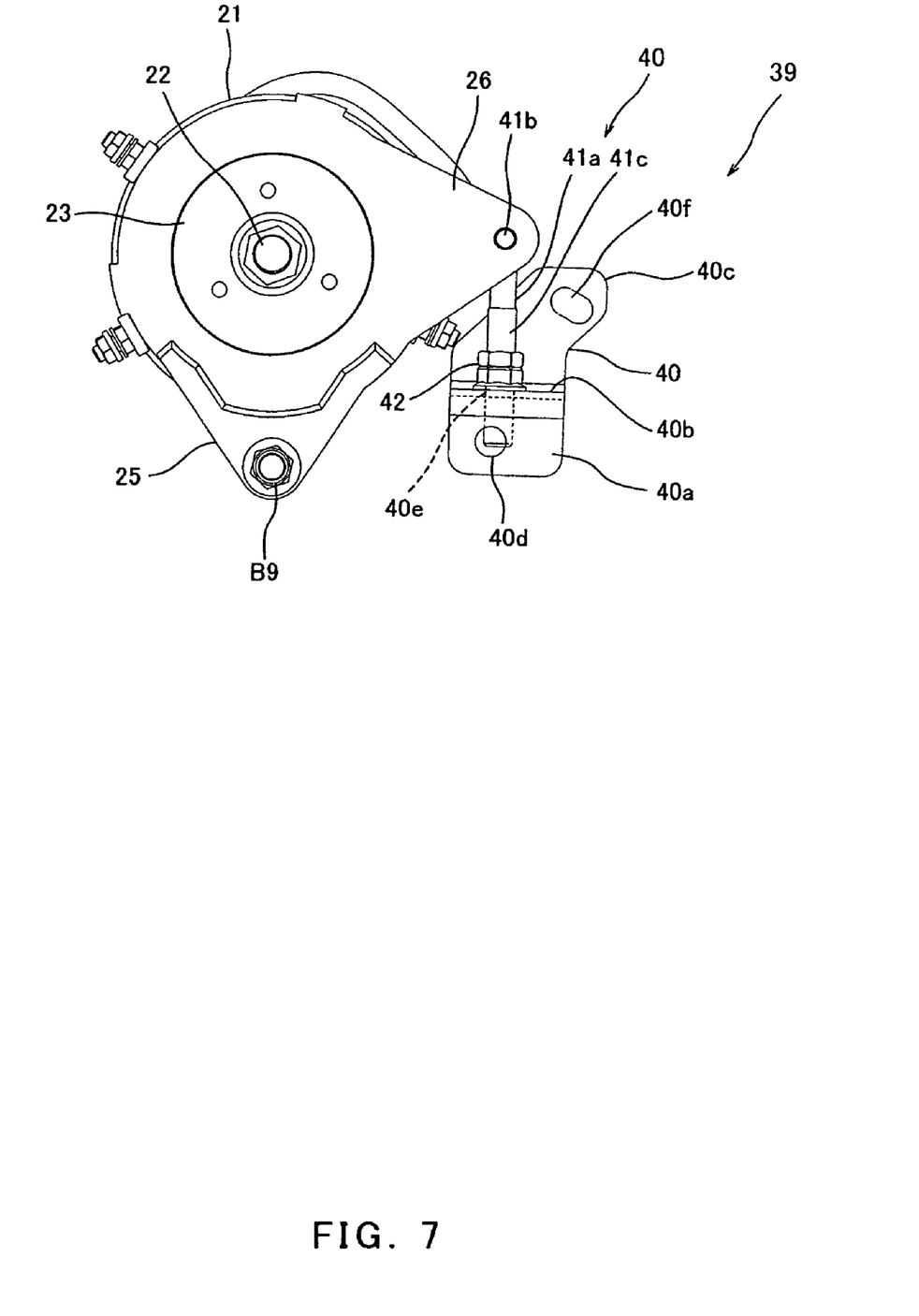
FIG. 7 is a right side view of the power unit for the vehicle of FIG. 1, showing a generator and a tensioner.

Turning to FIG. 6 again, a metal side bracket 40 is mounted on an upper region at the right side between the engine 2 and the transaxle 3 and is configured to couple the side plate 32 to the engine 2. The side bracket 40 is fastened at one end portion thereof by a bolt B10 to an upper region of a center part in the longitudinal direction of the side plate 32 and at an opposite end portion thereof to the engine 2 by a bolt B11. A L-shaped extensible rod 41 is protrusibly attached to the side bracket 40 by a double nut 42. As described later, the extensible rod 41 is coupled at an upper end portion thereof to the generator 21 (FIG. 7). The side bracket 40, the extensible rod 41, and the double nut 42 constitute a tensioner 39. By extending the extensible rod 41, the generator 21 is rotated, thereby applying tension to the transmission belt 24.

Figure 8:
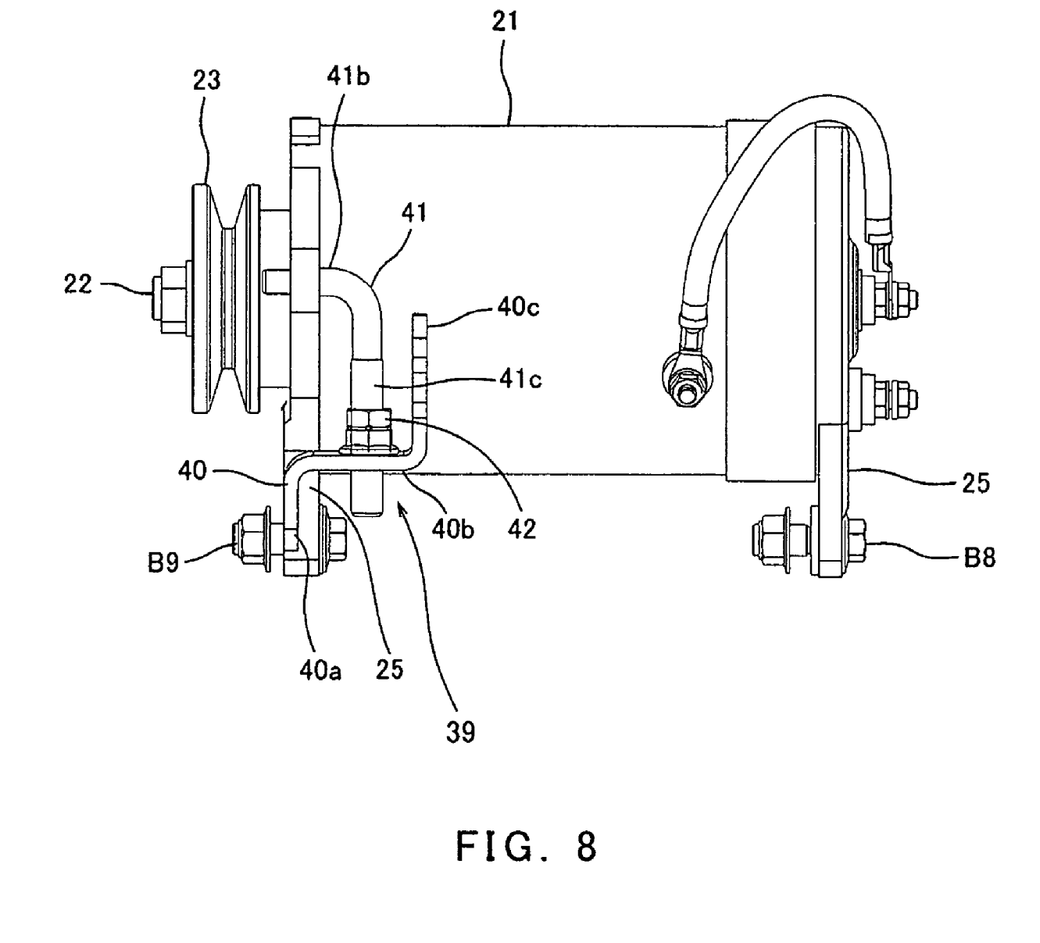
FIG. 8 is a front view of the power unit for the vehicle of FIG. 1, showing the generator and the tensioner.

FIG. 7 is a right side view of the power unit 1 for the vehicle of FIG. 1, showing the generator 21 and the tensioner 39. FIG. 8 is a front view thereof. As shown in FIGS. 7 and 8, the generator 21 has, on right and left side surfaces thereof, support flanges 25 protruding downward. As described above, the left support flange 25 is rotatably fastened to the generator bracket 38 (FIG. 6) by the bolt B8. The right support flange 25 is rotatably fastened to the side plate 32 (FIG. 6) by the bolt B9. A protruding portion 26 is formed to protrude forward from a right side surface of the generator 21. The extensible rod 41 of the tensioner 39 is coupled to the protruding portion 26.

To be specific, the tensioner 39 includes the side bracket 40, the extensible rod 41, and the double nut 42. The side bracket 40 includes a vertical plate portion 40a having a bolt hole 40d to fasten the side bracket 40 to the side plate 32 (FIG. 6), a horizontal plate portion 40b protruding inward in the lateral direction from an upper end of the vertical plate portion 40a and having an elongate hole 40e, and a vertical plate portion 40c protruding forward and upward from an inner end portion of the horizontal plate portion 40b and having an elongate bolt hole 40f to fasten the side bracket 40 to the engine 2. The extensible rod 41 includes a vertical rod portion 41a and a horizontal rod portion 41b protruding outward in the lateral direction from an upper end of the vertical rod portion 41a. A male threaded portion 41c is formed on an outer peripheral surface of a lower end side of the vertical rod portion 41a. With the vertical rod portion 41a of the extensible rod 41 inserted into the elongate hole 40e of the horizontal plate portion 40b of the side bracket 40, the double nut 42 is threadedly engaged with the male threaded portion 41c. The horizontal rod portion 41b of the extensible rod 41 is fastened at an upper end thereof to the protruding portion 26 of the generator 21. By rotating the double nut 42, the protruding amount of the extensible rod 41 protruding upward from the side bracket 40 is adjusted. Thereby, the generator 21 is rotated around the bolts B8 and B9, applying tension to the transmission belt 24 (FIG. 1).

Figure 9:
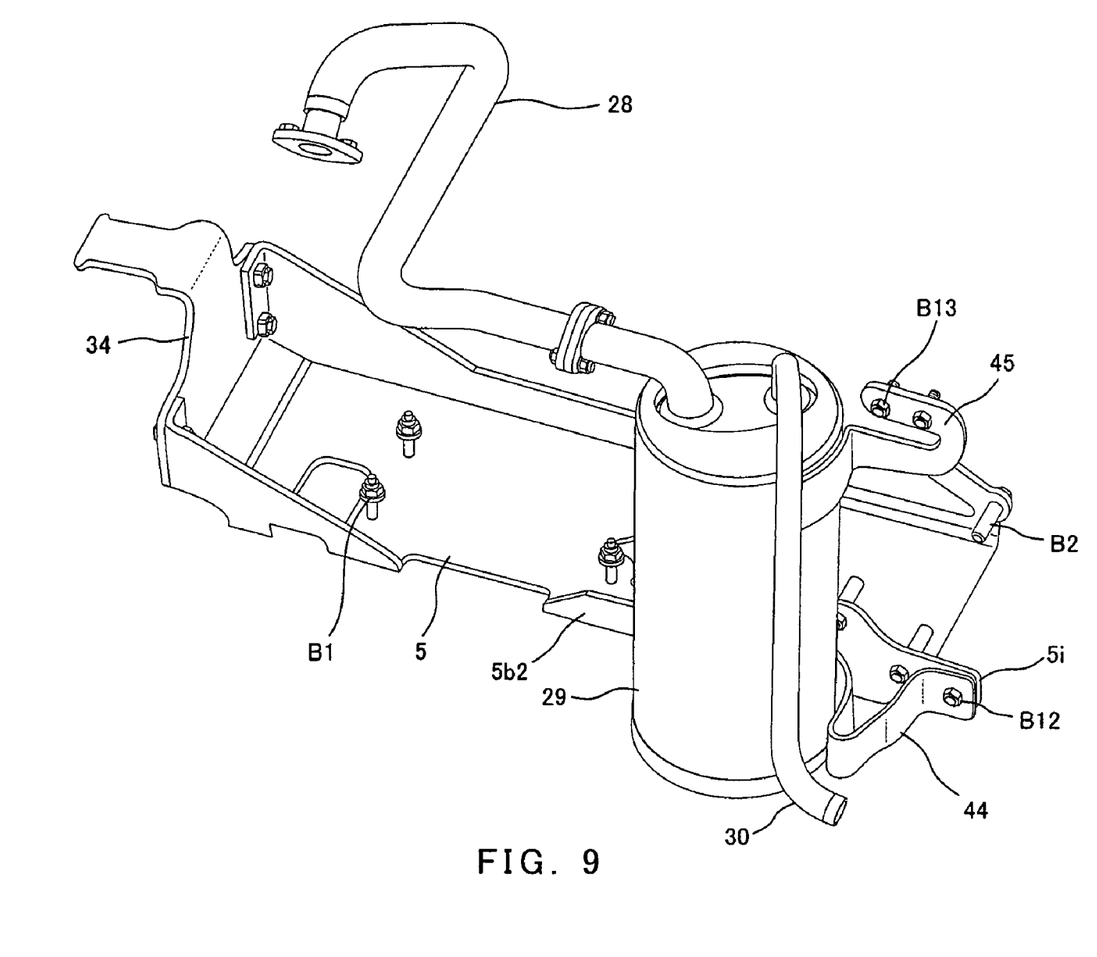
FIG. 9 is a perspective view of the power unit for the vehicle of FIG. 1, showing a muffler and a base plate.
Figure 10:
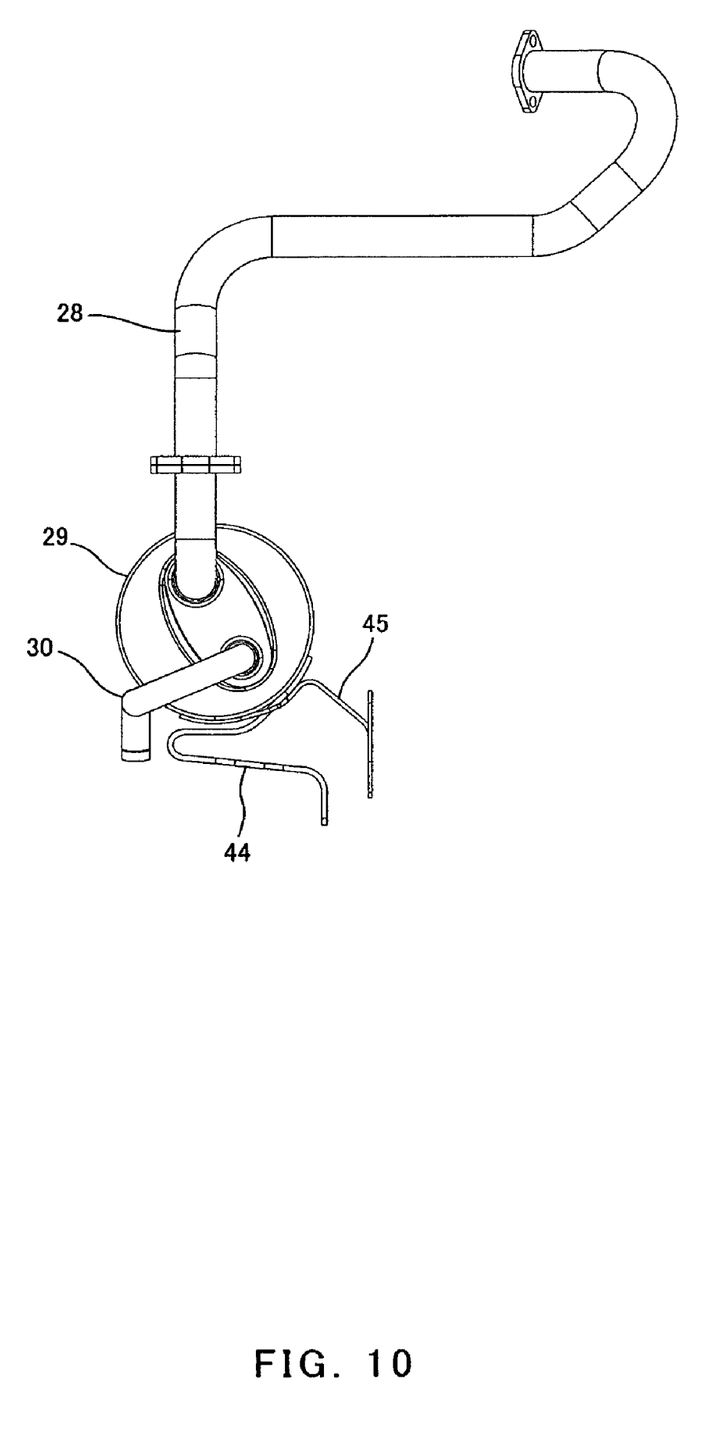
FIG. 10 is a perspective view of the power unit for the vehicle of FIG. 1, showing the muffler.

FIG. 9 is a perspective view showing in large part the muffler 29 and the base plate 5 of the power unit 1 of FIG. 1. FIG. 10 is a perspective view showing in large part the muffler 29 of the power unit 1 of FIG. 1. As shown in FIGS. 9 and 10, the muffler 29 is cylindrical, and is disposed on the left side of a rear portion of the base plate 5 in such a manner that its longitudinal direction conforms to a vertical direction, i.e., its center axis is oriented vertically. The downstream end of the first exhaust pipe 28 and the upstream end of the second exhaust pipe 30 are respectively coupled to the upper surface of the muffler 29. The downstream end of the second exhaust pipe 30, at which an exhaust gas outlet is formed, extends to the region in close proximity to the lower portion of the muffler 29. The muffler 29 is fastened to the second left side wall portion 5b2 of the base plate 5 via the first metal muffler bracket (lower muffler bracket) 44 by threading a bolt B12 into the bolt hole 5i formed on the second left side wall portion 5b2. The muffler 29 is fastened to the gear box 11 of the transaxle 3 via a second metal muffler bracket (upper muffler bracket) 45 by bolts B13.

The first muffler bracket 44 has an extra length to be bent in substantially a U-shape between the muffler 29 and the base plate 5 as viewed from above so that the first muffler bracket 44 has elasticity like a spring. The second muffler bracket 45 has an extra length to be slightly bent between the muffler 29 and the gear box 11 of the transaxle 3 as viewed from above, and its tip end portion is substantially U-shaped as viewed from the side so that the second muffler bracket 45 has elasticity like a spring. Whereas the muffler 29 is fastened to the base plate 5 and to the transaxle 3 by the first and second muffler brackets 44 and 45, respectively, it may alternatively be fastened to one of them.

In accordance with the above described power unit 1, since the engine 2 and the transaxle 3 are unitarily fastened to each other by using the base plate 5 rather than a pipe frame, productivity increases. In addition, since the base plate 5 covers the lower surface of the gear box 11 of the transaxle 3 as well as the lower surface of the engine 2, unwanted substances and so on from below do not contact the lower surface of the gear box 11 of the transaxle 3 during travel of the vehicle. As a result, durability of the gear box 11 improves.

Since the base plate 5 formed by the bottom wall portion 5a, and the side wall portions 5b1, 5b2, and 5c has a concave cross-section, its stiffness improves in contrast to a flat plate.

Since the engine 2, the transaxle 3, and the base plate 5 are coupled to each other by the side plate 32, stiffness of the entire power unit 1 improves. Since the side plate 32 enables the output shaft 10 of the engine 2 and the input shaft 14 of the transaxle 3 to be positioned, the CVT 4 can be mounted to the output shaft 10 and to the input shaft 14 easily and surely. Since the side plate 32 is formed of the flat plate, it can be manufactured easily by punching. As a result, a manufacturing cost can be reduced. In addition, stiffness of the power unit 1 in a direction of a plane of the side plate 32 improves.

Since the engine 2 and the transaxle 3 are coupled to each other by the generator bracket 38 and the generator 21 fastened to the generator bracket 38 is fastened to the side plate 32, stiffness of the whole power unit 1 improves.

Since the left side wall portion 5b1 and the right side wall portion 5c of the base plate 5 are coupled to each other by the joint bracket 34, stiffness of the base plate 5 further improves. Since the joint bracket 34 is separable from the base plate 5, change of the structure, position or the like of mounting portions of the vehicle body frame can be addressed by changing only the joint bracket 34. Thus, design changes can be achieved flexibly.

Since the muffler 29 is disposed in the space which is lateral of a rear portion of the base plate 5 to extend vertically, and the muffler 29 is fastened to the base plate 5 and to the transaxle 3, the power unit with the muffler 29 can be formed with a compact configuration. Even if the exhaust pipe 28 is thermally deformed by heat of the exhaust gas, the resulting load is absorbed by the muffler brackets 44 and 45 coupling the muffler 29 to the base plate 5 and the transaxle 3, because of their elasticity. This makes it possible to avoid an event that the exhaust pipe 28 is subjected to undesired stress.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A power unit for a vehicle comprising:
   an engine configured to drive the vehicle;
   a transaxle coupled to a drive wheel;
   a power transmission system which is coupled to the engine and to the transaxle and is configured to transmit a rotational force output from the engine to the transaxle;
   a base plate fastened to the engine and to the transaxle so as to cover a lower surface of the engine and a lower surface of the transaxle;
   a generator configured to be driven by the engine to generate an electric power; and
   a side plate laterally fastened to the engine, to the transaxle, and to the base plate,
   wherein an output shaft of the engine and an input shaft of the transaxle protrude laterally in a same direction,
   wherein the side plate has a first insertion portion into which the output shaft is inserted to position the engine and a second insertion portion into which the input shaft is inserted to position the transaxle,
   wherein a transmission belt is installed around a pulley of the output shaft of the engine and a pulley of an input shaft of the generator, and
   wherein the generator is fastened to a generator bracket configured to couple the engine to the transaxle, and also is fastened to the side plate.

2. The power unit for a vehicle according to claim 1, wherein the base plate includes a planar bottom wall portion configured to cover the lower surface of the engine and the lower surface of the transaxle, and a pair of side wall portions respectively protruding upward from both end portions of the bottom wall portion.

3. The power unit for a vehicle according to claim 2, further comprising:
   a joint bracket fastened to the base plate to couple the power unit to a vehicle body frame of the vehicle;
   wherein the joint bracket is provided to couple the pair of side wall portions to each other.

4. The power unit for a vehicle according to claim 1, wherein the side plate is a flat plate, and is fastened to a side surface of the engine, to a side surface of the transaxle, and to a side surface of the base plate, by bolts.

5. The power unit for a vehicle according to claim 1, wherein the generator is rotatably mounted on a common axis to the generator bracket and to the side plate, the power unit further comprising:
   a tensioner configured to apply a force to cause the generator to be rotated around the common axis in a direction to apply a tension to the transmission belt.

6. The power unit for a vehicle according to claim 5, wherein the tensioner includes a side bracket coupled to the side plate and to the engine, and an extensible rod protrusible from the side bracket; and
   wherein the extensible rod is coupled to the generator and is extensible and retractable to cause the generator to be rotated.

7. The power unit for a vehicle according to claim 1, further comprising:
   a muffler coupled to the engine through an exhaust pipe;
   wherein the muffler is coupled to the base plate and/or to the transaxle by a muffler bracket, and the muffler bracket is bent so as to have elasticity.

8. A power unit for a vehicle comprising:
   an engine configured to drive the vehicle;
   a transaxle coupled to a drive wheel;
   a power transmission system which is coupled to the engine and to the transaxle and is configured to transmit a rotational force output from the engine to the transaxle;
   a base plate fastened to the engine and to the transaxle so as to cover a lower surface of the engine and a lower surface of the transaxle;
   a side plate laterally fastened to the engine, to the transaxle, and to the base plate; and
   a generator configured to be driven by the engine to generate an electric power,
   wherein a transmission belt is installed around a pulley of an output shaft of the engine and a pulley of an input shaft of the generator, and
   wherein the generator is fastened to the side plate.

9. The power unit for a vehicle according to claim 8, wherein the generator is fastened to a generator bracket configured to couple the engine to the transaxle.

10. The power unit for a vehicle according to claim 8, wherein the output shaft of the engine and an input shaft of the transaxle protrude laterally in a same direction; and
    wherein the side plate has a first insertion portion into which the output shaft is inserted to position the engine and a second insertion portion into which the input shaft is inserted to position the transaxle.

* * * * *